May 23, 1939.  D. G. K. MOSS  2,159,099
GYROSCOPIC NAVIGATION INSTRUMENT
Filed March 8, 1938  2 Sheets-Sheet 1

DOUGLAS GEORGE KING MOSS
INVENTOR
By
His At'y.

May 23, 1939.        D. G. K. MOSS        2,159,099
GYROSCOPIC NAVIGATION INSTRUMENT
Filed March 8, 1938        2 Sheets-Sheet 2

DOUGLAS GEORGE KING MOSS
INVENTOR
By Otto Munk
His At'y.

Patented May 23, 1939

2,159,099

UNITED STATES PATENT OFFICE 2,159,099

GYROSCOPIC NAVIGATION INSTRUMENT

Douglas George King Moss, Sanderstead, England, assignor to Mechanism Limited, Croydon, England, a limited corporation of Great Britain Application March 8, 1938, Serial No. 194,546
In Great Britain March 15, 1937

4 Claims. (Cl. 74—5)

This invention relates to improvements in gyroscopic navigational instruments.

The object of the present invention is to increase the sensitivity of the valves controlling the erection of the gyroscope and minimise frictional disturbances.

According to the present invention, the rollable valve member is supported by pins located in straight line slots.

The invention as applied to an artificial horizon instrument is hereinafter more fully described and illustrated in the accompanying drawings, in which.

Figure 1:
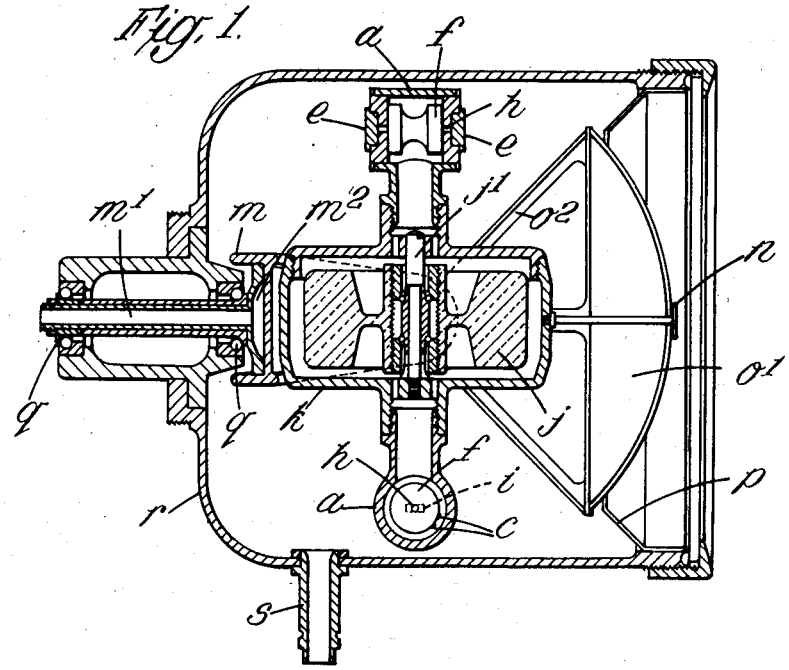
Figure 1 is a vertical section through a gyro vertical, and shows rolling disc valves arranged so that they can roll to control the air jets.

Referring to the drawings, the gyro wheel $j$ is rotatably mounted on a vertical spindle $j^1$ in an air-tight casing $k$ which constitutes an inner gimbal and which is rotatably mounted on inner gimbal trunnions $l$ carried by an outer U-shaped gimbal $m$ which in turn is rotatably mounted by means of a hollow spindle $m^1$ in spaced bearings $q$ forming an outer gimbal trunnion. This trunnion is housed in the back of the casing $r$. The axes of the trunnions intersect the vertical axis of the gyro wheel at the centre of the moving system.

Means for producing an erecting torque comprise rolling valves $f$ supported by pins $h$ suitably radiussed and burnished, disposed in straight line slots $i$, $i^1$ provided in the end walls $b$ of the casing $a$, which are closed by the plugs $e$ lightly engaging the ends of the pins $h$. Oppositely directed air exit orifices $c$ and $d$ are provided in the opposite end walls respectively and adapted to be obstructed by the valve.

Figure 2:
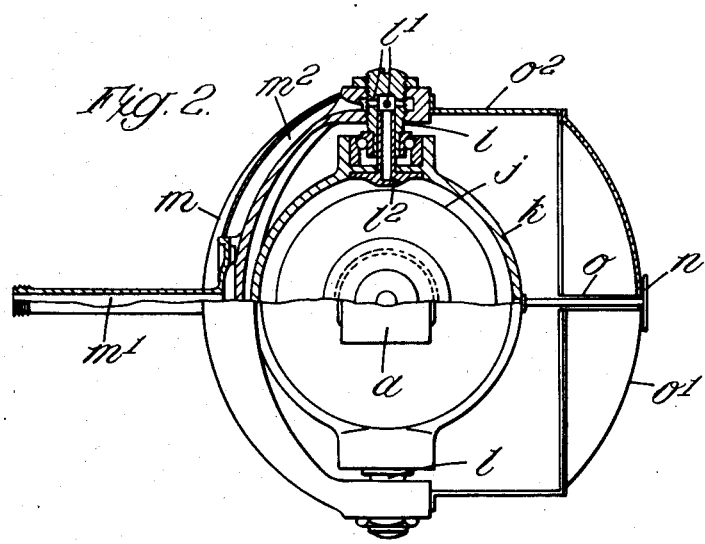
Figure 2 is a sectional plan of the same with the casing removed.
Figure 3:
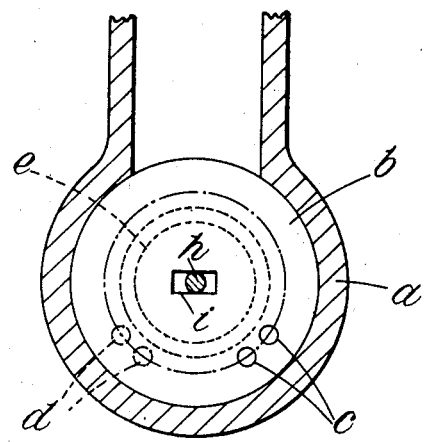
Figure 3 is a vertical section taken on the line I—I of Figure 4.
Figure 4:
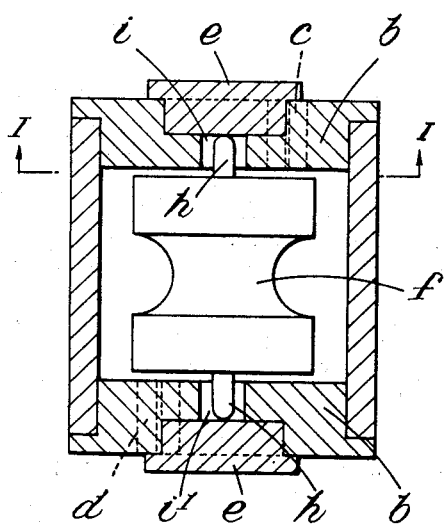
Figure 4 is a horizontal section.

The air-flow, which drives the gyro wheel, is subsequently controlled by the valves so as to produce an erecting torque should the wheel spinning axis be disposed from vertical. Usually, a Venturi suction tube or other suitable means is attached to the tube $s$, and in flight air is drawn through the hollow spindle $m^1$ at the inner end of which the air-stream divides and passes through a channel in each horn of the gimbal $m$ and then through inlet orifices in the inner gimbal bearings whence it passes through the trunnion and issues through an exit orifice as a jet which impinges on and drives the gyro wheel. As this construction of the horn of the gimbal $m$ and the trunnion is the same on each side of the gyro wheel it will suffice to identify the parts shown in section in Figure 2; in that figure $m^2$ is the air-channel, $l^1$ are the inlet orifices and $l^2$ is the exit orifice. The air-stream passes from the casing $k$ into the valve chambers $a$. When the gyro wheel axis deviates from the true vertical one or both of the valves will roll (depending upon whether the deviation is in a direction fore-and-aft or thwartships, or in both directions) thus uncovering a greater area of the exit orifices $c$ at one end of the valve chamber and covering a greater area of the exit orifices $d$ at the other end of the valve chamber, and thereby varying the intensity of the issuing air-jets and consequently producing the desired erecting torque. In the case of excessive deviation, the exit orifices $c$ will be completely opened and the exit orifices $d$ completely closed.

The valve roller is not self-centering and, in operation, oscillates slightly and continuously thereby creating and correcting minute precessions. It will also be appreciated that, in this way, the gimbal bearings are kept alive, friction-effects minimised and pitting of the caps and/or cones of the bearings avoided.

In an artificial horizon instrument such as has been described, the straight line slots are normal to the spinning axis.

The desired indications are obtained by means of an indicator $n$ (Figures 1 and 2) which is attached to the gyroscope wheel casing $b$ so as to extend at right angles to the wheel axis and also at right angles to the trunnion bearings $l$. This indicator works in a slot $o$ in a dial $o^1$ which is carried by a spider $o^2$, fixed to the gimbal $d$. When there is any deviation from the true level in the fore-and-aft direction relative movement takes place between the indicator and the cross level dial $o^1$ and the extent of the deviation is indicated by the position of the indicator in the slot $o$. Any deviation from the true level in thwartships direction is indicated by the displacement of a ring $p$ (Figure 1) which is fixed to the casing $f$, relatively to the dial $o^1$, the ring being preferably marked in degrees and the dial being suitably marked so that the extent of the displacement can be ascertained with ease. The true level is indicated by the setting of the indicator $n$ in the middle of the dial with the dial itself positioned vertical in the outer casing.

It is to be understood that the position of the controlling valves on the inner gimbal may be varied so long as the air jets act to produce the erecting torque. Also, the air-stream for these jets may be supplied from some other source than that employed to drive the gyro wheel.

I claim:

1. In a gyroscopic navigational instrument, a valve chamber provided with a pair of straight line slots, a rollable valve member, supporting means for said valve member, said supporting means being movably disposed in said slots and permitting said valve member to move back and forth in said slots, said chamber being provided with orifices adapted to be opened and closed by the valve member during its movements.

2. In a gyroscopic navigational instrument, an air driven gyro wheel, a casing therefor, at least one valve chamber communicating with said casing, a straight-line slot in each of the end walls of said chamber, a rollable valve supported in said chamber by means of pins at its ends resting in said slots, and air exit orifices in the end walls of the chamber adapted to be opened and closed by the valve member during its movements.

3. In a gyroscopic navigational instrument, a gyro wheel, a casing therefor having at least one chamber with oppositely directed air-exit orifices, straight-line slots in the end wall of said chamber, pins in said slots supporting within the chamber a rollable valve controlling the opening and closing of said orifices whereby said orifices will be continuously opened and closed to apply erecting torques to the gyro wheel which create and correct minute precessions thereof.

4. In a gyroscopic navigational instrument, a gyro wheel having a spin axis normally substantially vertical, a casing for the gyro wheel having a chamber with air-inlet and oppositely directed air-exit orifices and straight-line slots adjacent each orifice, a rollable valve supported in said chamber by means of pins at its ends resting in said slots and adapted during rolling to open and close the exit orifices, whereby upon departure of the gyro wheel axis from the true vertical and in accordance with the direction of the tilt of the gyro spin axis, said valve rolls to cover one and uncover another orifice to apply a precessing torque to the gyro wheel through the unbalanced air jet emerging from the open exit.

DOUGLAS GEORGE KING MOSS.